US008880644B2

(12) United States Patent
Menjo (10) Patent No.: US 8,880,644 B2
(45) Date of Patent: Nov. 4, 2014

(54) PROGRAMMABLE LOGIC CONTROLLER (75) Inventor: Yusuke Menjo, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 72 days.

(21) Appl. No.: 13/518,762

(22) PCT Filed: Oct. 27, 2011

(86) PCT No.: PCT/JP2011/074851
§ 371 (c)(1),
(2), (4) Date: Jun. 22, 2012

(87) PCT Pub. No.: WO2013/061451
PCT Pub. Date: May 2, 2013

(65) Prior Publication Data
US 2013/0110973 A1    May 2, 2013

(51) Int. Cl.
G06F 15/16    (2006.01)
(52) U.S. Cl.
USPC ............ 709/217; 709/218; 709/219; 709/220
(58) Field of Classification Search
None
See application file for complete search history.

(56) References Cited

U.S. PATENT DOCUMENTS

| 2003/0229809 | A1* | 12/2003 | Wexler et al. | 713/201 |
| 2004/0156313 | A1* | 8/2004 | Hofmeister et al. | 370/229 |
| 2005/0213561 | A1* | 9/2005 | Yao et al. | 370/351 |
| 2007/0217392 | A1* | 9/2007 | Motosugi | 370/351 |
| 2008/0240136 | A1 | 10/2008 | Motosugi | |
| 2011/0182221 | A1 | 7/2011 | Arakawa | |

FOREIGN PATENT DOCUMENTS

| JP | 2005-168144 A | 6/2005 |
| JP | 2005-197936 A | 7/2005 |
| JP | 2005-268988 A | 9/2005 |
| JP | 2007-249472 A | 9/2007 |
| JP | 2010-263303 A | 11/2010 |
| JP | 2011-155589 A | 8/2011 |
| JP | 2012-506269 A | 4/2012 |

OTHER PUBLICATIONS

International Search Report for PCT/JP2011/074851 dated Dec. 13, 2011.
Japanese Office Action for JP 2012-506269 dated Apr. 24, 2012 English Translation.
Korean Office Action (Reason for Rejection) Aug. 20, 2013, KPA No. 10-2012-7017278.
Taiwanese Office Action in Application No. 10320920940 mailed on Jul. 7, 2014.

* cited by examiner

*Primary Examiner* — Djenane Bayard
(74) *Attorney, Agent, or Firm* — Sughrue Mion, PLLC; Richard C. Turner (57) ABSTRACT

A programmable logic controller includes a CPU unit. The CPU unit has a real IP address and a pseudo IP address different from the real IP address, transmits and receives data by using the real IP address to and from a communication device belonging to a network in which communication is performed using a first communication protocol, and transmits and receives data by using the pseudo IP address to and from a communication device belonging to a network in which communication is performed using a second communication protocol different from the first communication protocol.

5 Claims, 7 Drawing Sheets

PROGRAMMABLE LOGIC CONTROLLER

CROSS REFERENCE TO RELATED APPLICATIONS

This application is a National Stage of International Application No. PCT/JP2011/074851 filed Oct. 27, 2011, the contents of which are incorporated herein by reference in their entirety.

FIELD

The present invention relates to a programmable logic controller used being connected to a network.

BACKGROUND

In a conventional programmable logic controller, communication has been performed by regarding a plurality of networks as one network using a virtual IP address. As for programmable logic controllers connected to different networks having different IP network addresses, respectively, a routing function is installed in the programmable logic controllers to perform communication to the different networks.

Network devices of types different from the Ethernet® ("®" is hereinafter omitted) are connected to one another by using a heterogeneous network gateway.

Communication with a communication device connected to a network having a different network address from a real IP address can be performed by using, for example, a routing function disclosed in Patent Literature 2. However, for a programmable logic controller and a communication device connected to different types of networks, a heterogeneous network gateway system disclosed in Patent Literature 3 needs to be established.

CITATION LIST

Patent Literatures

Patent Literature 1: Japanese Patent Application Laid-open No. 2005-168144
Patent Literature 2: Japanese Patent Application Laid-open No. 2005-268988
Patent Literature 3: Japanese Patent Application Laid-open No. 2007-249472

SUMMARY

Technical Problem

The present invention has been achieved to solve the above problems, and it is an object of the present invention to provide a programmable logic controller that can perform communication by using an Ethernet packet without providing a heterogeneous network gateway system for a programmable logic controller and a communication device connected to different types of networks.

Solution to Problem

In order to solve the above problem and in order to attain the above object, a programmable logic controller of the present invention includes a CPU unit. The CPU unit has a real IP address and a pseudo IP address different from the real IP address, transmits and receives data by using the real IP address to and from a communication device belonging to a network in which communication is performed using a first communication protocol, and transmits and receives data by using the pseudo IP address to and from a communication device belonging to a network in which communication is performed using a second communication protocol different from the first communication protocol.

Advantageous Effects of Invention

The programmable logic controller according to the present invention enables communication by using the Ethernet packet without providing a heterogeneous network gateway system for the programmable logic controller and a communication device connected to different types of networks.

DESCRIPTION OF EMBODIMENTS

Exemplary embodiments of a programmable logic controller according to the present invention will be explained below in detail with reference to the accompanying drawings. The present invention is not limited to the embodiments.

First Embodiment

Figure 1:
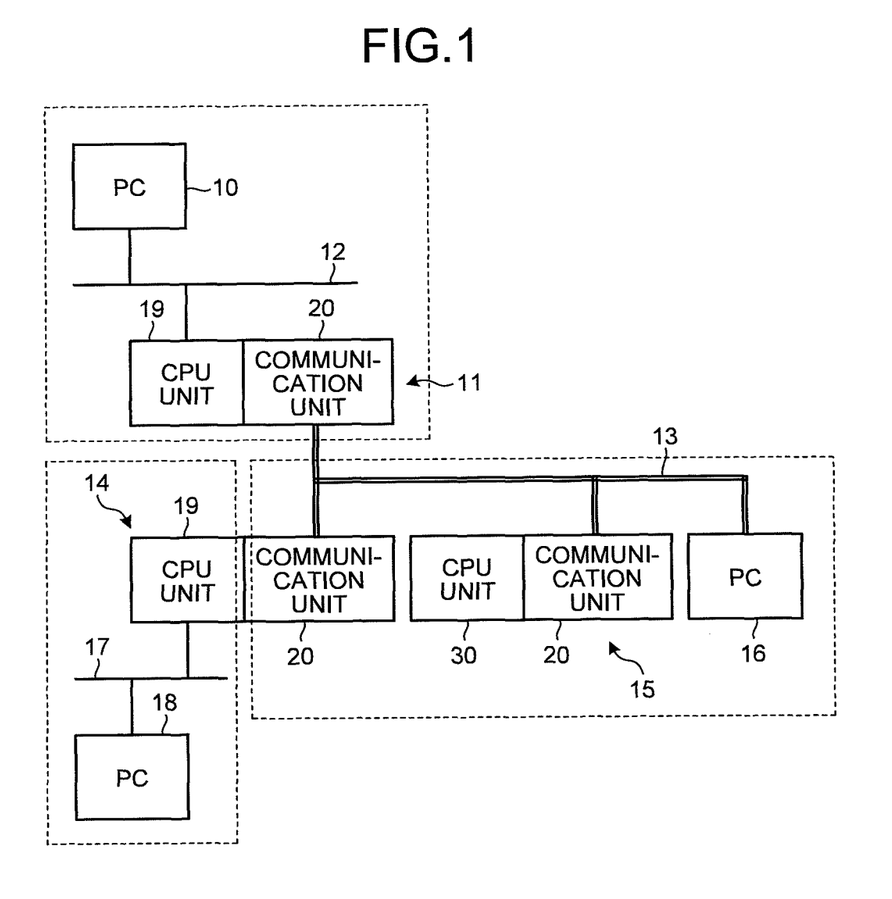
FIG. 1 is an example of a network system including programmable logic controllers according to a first embodiment of the present invention.

FIG. 1 is an example of a network system including programmable logic controllers according to a first embodiment of the present invention. The network system includes personal computers (hereinafter, PCs) 10, 16, and 18, and programmable logic controllers 11, 14, and 15, which are connected with one another.

The PC 10 and the programmable logic controller 11 are connected to a first network 12 via the Ethernet. The first network 12 performs communication by using the Ethernet as a first communication protocol.

The programmable logic controller 11 is also connected to a second network 13 of a different type from the Ethernet. The second network 13 performs communication by using a protocol other than the Ethernet as a second communication protocol. The programmable logic controller 14, the programmable logic controller 15, and the PC 16 are connected to the second network 13.

Although not shown, devices such as a drive unit can be also connected to the second network 13. The programmable logic controller 14 is connected to a third network 17 via the Ethernet and is connected to the PC 18 via the third network 17. The third network 17 performs communication by using the Ethernet as the first communication protocol.

The programmable logic controller 11 includes a CPU unit 19 having an Ethernet port incorporated therein and a communication unit 20. The programmable logic controller 11 also includes a unit (not shown) other than the CPU unit 19 and the communication unit 20.

The CPU unit 19 includes an interface connectable to a network via the Ethernet. The CPU unit 19 has functions of an FTP client, an FTP server and the like incorporated therein, and can perform data communication with the PC 10 connected to the first network 12 via the Ethernet. That is, the PC 10 functions as the FTP server, the FTP client and the like.

The communication unit 20 is connected to the network 13 different from the Ethernet. The communication unit 20 has a cyclic transmission function, and performs data communication with the programmable logic controller 14, the programmable logic controller 15, the PC 16 and the like.

The programmable logic controller 14 includes the CPU unit 19 and the communication unit 20, as the programmable logic controller 11. The PC 18 connected to the CPU unit 19 of the programmable logic controller 14 functions as an FTP server, an FTP client and the like.

The programmable logic controller 14 also includes a unit (not shown) other than the CPU unit 19 and the communication unit 20 as the programmable logic controller 11.

The programmable logic controller 15 includes the communication unit 20, as the programmable logic controllers 11 and 14. The programmable logic controller 15 also includes a CPU unit 30 that does not have an Ethernet port incorporated therein, unlike the programmable logic controllers 11 and 14.

The programmable logic controller 15 also includes a unit (not shown) other than the CPU unit 30 and the communication unit 20, as the programmable logic controllers 11 and 14.

Figure 2:
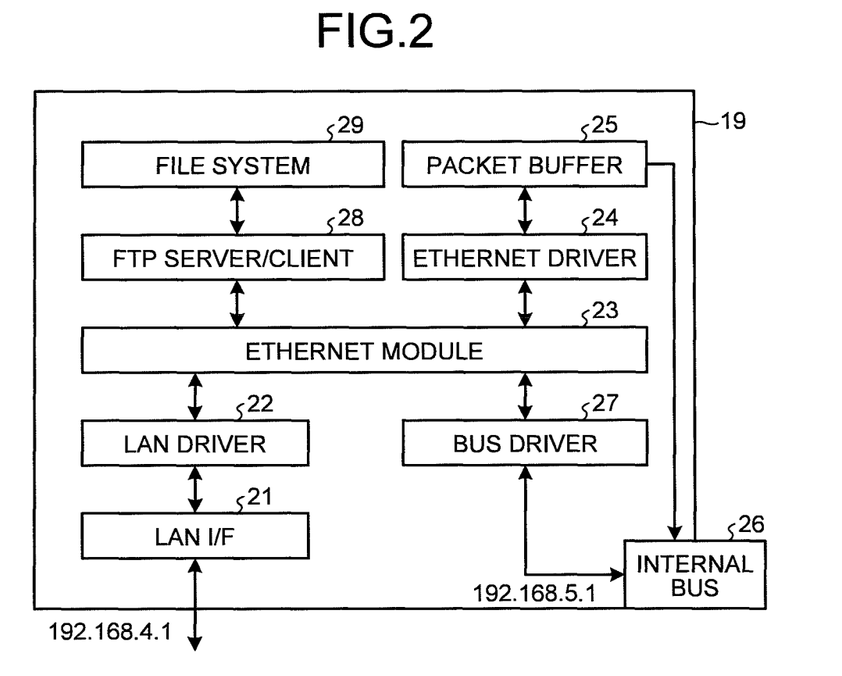
FIG. 2 is a block diagram of a schematic configuration of a CPU unit included in the programmable logic controllers.

A configuration of the CPU unit 19 having the Ethernet port incorporated therein is explained below in detail. FIG. 2 is a block diagram of a schematic configuration of the CPU unit 19 included in the programmable logic controllers 11 and 14.

The CPU unit 19 includes a LAN interface (hereinafter, also "LAN I/F") (first port) 21 connectable to the Ethernet, a LAN driver 22, an Ethernet module 23, an Ethernet driver 24, and a packet buffer 25 in this order from a lower level.

The CPU unit 19 can be connected to an internal bus (second port) 26, and includes a bus driver 27 for the internal bus 26 that performs data transfer between the CPU unit 19 and other units. The CPU unit 19 includes an FTP server/client 28 and a file system 29 separately from the Ethernet driver 24 in higher layers than the Ethernet module 23.

The Ethernet module 23 in the CPU unit 19 determines a transfer destination of received data based on an IP address of the data. That is, upon reception of data with an IP address other than that of the own CPU, the Ethernet module 23 transfers the data to the Ethernet driver 24.

The FTP server/client 28 in the CPU unit 19 can generate data to be transmitted from an IP address of the own CPU (for example, 192.168.4.1) and data to be transmitted from a pseudo IP address (for example, 192.168.5.1). The generated data are distributed by the Ethernet module 23.

Figure 3:
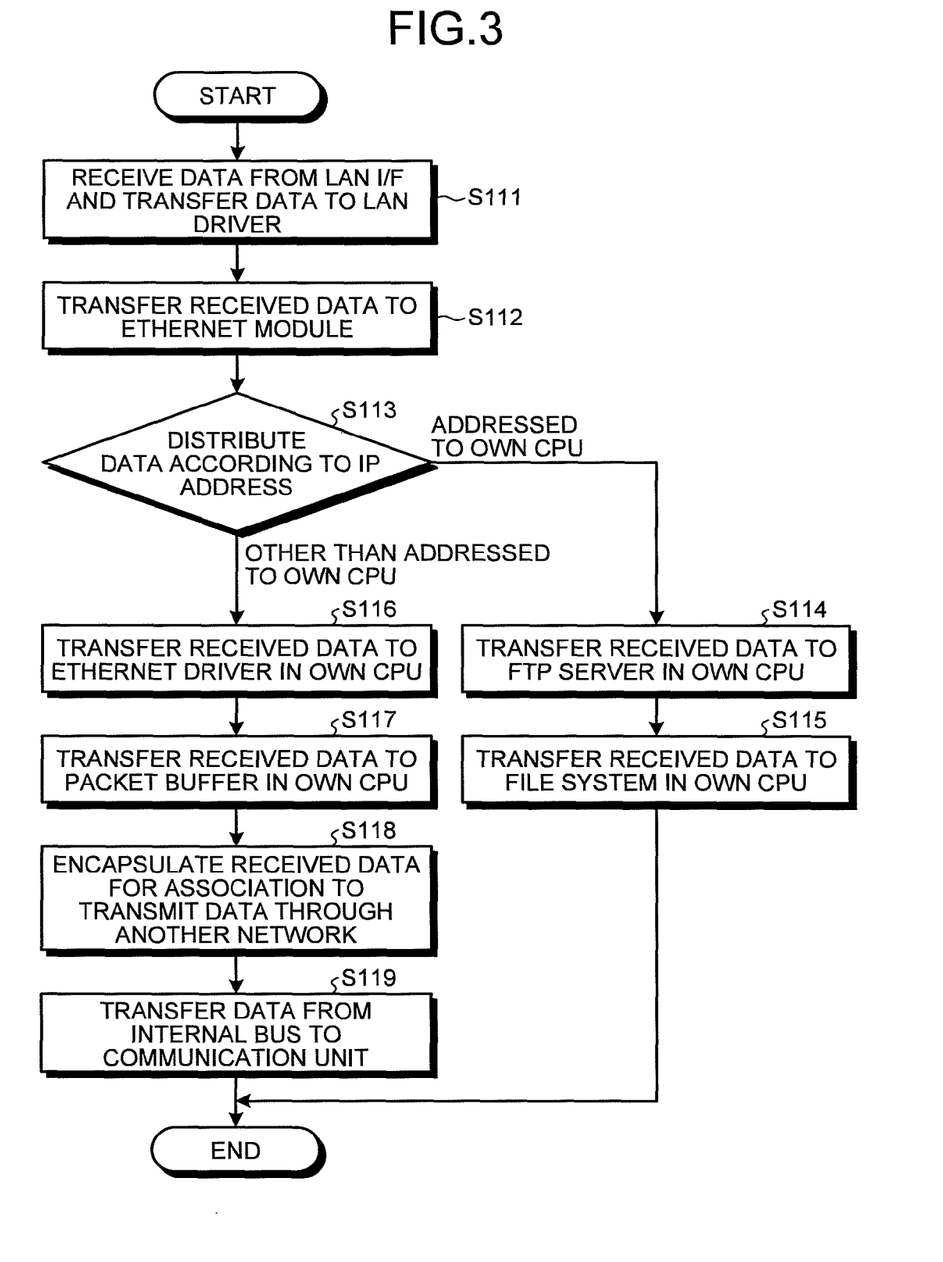
FIG. 3 is a flowchart of a process procedure performed when the CPU unit receives data from a LAN interface.

An operation of the CPU unit is explained next. FIG. 3 is a flowchart of a process procedure performed when the CPU unit 19 receives data from the LAN interface 21. First, at Step S111, data received from the LAN interface 21 is transferred to the LAN driver 22. At Step S112, the received data is transferred from the LAN driver 22 to the Ethernet module 23.

At Step S113, the Ethernet module 23 confirms an IP address of a destination attached to a header of the received data, and distributes the received data according to whether the data has the IP address of the own CPU (for example, the real IP address such as 192.168.4.1 or the pseudo IP address such as 192.168.5.1) or another IP address.

When the destination of the received data is the IP address of the own CPU, the Ethernet module 23 proceeds to Step S114 to transfer the received data to the FTP server/client 28 in the CPU. At Step S115, the FTP server/client 28 transfers the received data to the file system 29 in the own CPU.

When the destination of the received data is an IP address other than that of the own CPU, the Ethernet module 23 proceeds to Step S116 from Step S113 to transfer the received data to the Ethernet driver 24 in the CPU unit 19.

At Step S117, the Ethernet driver 24 transfers the received data to the packet buffer 25 in the CPU unit 19. At Step S118, to transmit the data through a different type of network from the Ethernet, the packet buffer 25 encapsulates the received data, so that the received data is associated with a protocol of the different type of network from the Ethernet. At Step S119, the encapsulated data is transferred from the internal bus 26 to the communication unit 20.

Figure 4:
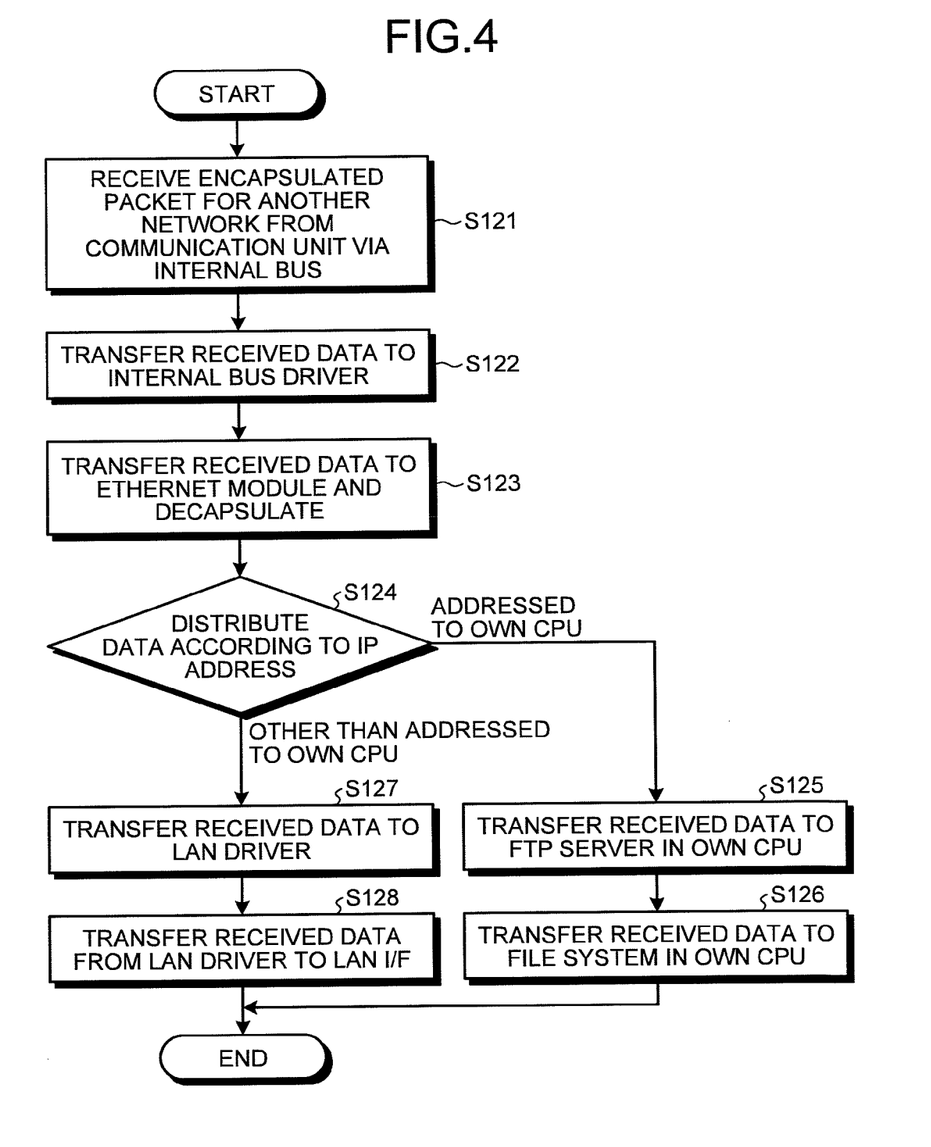
FIG. 4 is a flowchart of a process procedure performed when the CPU unit receives data from a communication unit via an internal bus.

FIG. 4 is a flowchart of a process procedure performed when the CPU unit 19 receives data from the communication unit 20 via the internal bus 26. At Step S121, the CPU unit 19 receives an encapsulated packet from the communication unit 20 via the internal bus 26.

At Step S122, the received data is transferred to the bus driver 27. At Step S123, the received data is transferred to the Ethernet module to decapsulate the data. At Step S124, the Ethernet module 23 confirms an IP address of a destination attached to the header of the received data, and distributes the received data according to whether the IP address is of the own CPU or another IP address.

When the destination of the received data is an IP address of the own CPU, the Ethernet module 23 proceeds to Step S125 to transfer the received data to the FTP server/client 28 in the own CPU. At Step S126, the FTP server/client 28 transfers the received data to the file system 29 in the own CPU.

When the destination of the received data is an IP address other than that of the own CPU, the Ethernet module 23 proceeds to Step S127 from Step S124 to transfer the received data to the LAN driver 22. At Step S128, the received data is transferred from the LAN driver 22 to the LAN I/F 21.

Figure 5:
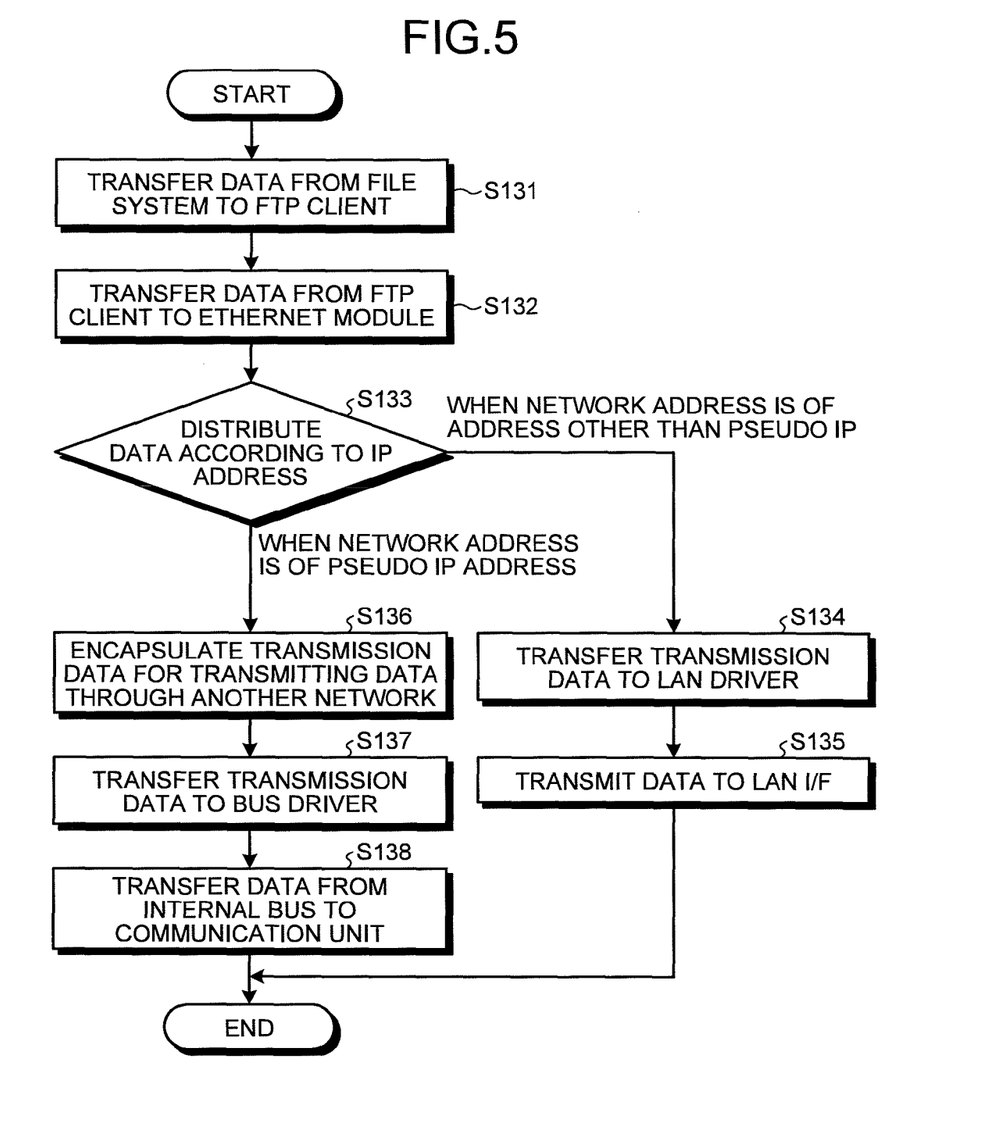
FIG. 5 is a flowchart of a process procedure performed when data is transmitted from the CPU unit via the Ethernet or via a different type of network from the Ethernet.

FIG. 5 is a flowchart of a process procedure performed when data is transmitted from the CPU unit 19 via the Ethernet or via a different type of network from the Ethernet. At Step S131, data is transferred from the file system 29 to the FTP server/client 28.

At Step S132, data is transferred from the FTP server/client 28 to the Ethernet module 23. At Step S133, the Ethernet module 23 distributes transmission data according to whether a network address of the IP address as a destination of the transmission data is of the pseudo IP address or of an address other than the pseudo IP address (the real IP address).

When the network address is of an address other than the pseudo IP address (the real IP address), the Ethernet module 23 proceeds to Step S134 to transfer the transmission data to the LAN driver 22 for transmitting the data via the Ethernet (for example, the first network 12 or the third network 17). At Step S135, the transmission data is transmitted to the LAN I/F 21.

When the network address is of the pseudo IP address, the Ethernet module 23 proceeds to Step S136 from Step S133 to encapsulate the transmission data for transmitting the data via another network different from the Ethernet (for example, the second network 13). At Step S137, the Ethernet module 23 transfers the transmission data to the bus driver 27. At Step S138, the transmission data is transferred from the bus driver 27 to the internal bus 26, and then from the internal bus 26 to the communication unit 20.

Figure 6:
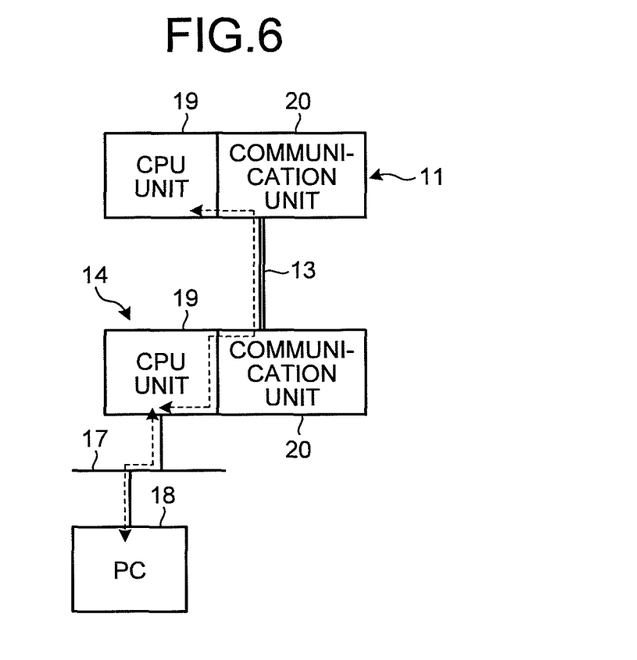
FIG. 6 is an explanatory diagram of an example of transmission and reception of data by a programmable logic controller connected via another network in the network system shown in FIG. 1.

FIG. 6 is an explanatory diagram of an example of transmission and reception of data by a programmable logic controller connected via another network in the network system shown in FIG. 1. The CPU unit 19 of the programmable logic controller 14 has two IP addresses, that is, the real IP address and the pseudo IP address, thereby enabling transmission and reception of data via the second network 13 of a different type from the Ethernet and transmission and reception of data via the Ethernet (the third network 17).

In FIG. 6, data communication is performed from the internal bus 26 of the CPU unit 19 and the communication unit 20 (see also FIG. 2) to the CPU unit 30 of the programmable logic controller 15 via the second network 13 of a different type from the Ethernet. The data transmitted from the internal bus 26 of the CPU unit 19 and the communication unit 20 is encapsulated and transmitted as an Ethernet packet as described above.

Further, in FIG. 6, data communication is performed from the Ethernet port of the CPU unit 19 to the PC 18 via the third network 17, which is the Ethernet. Thus, the CPU unit 19 can process both the data communication via the LAN interface 21 connectable to the Ethernet and the data communication via the internal bus 26 connectable to a network different from the Ethernet.

Figure 7:
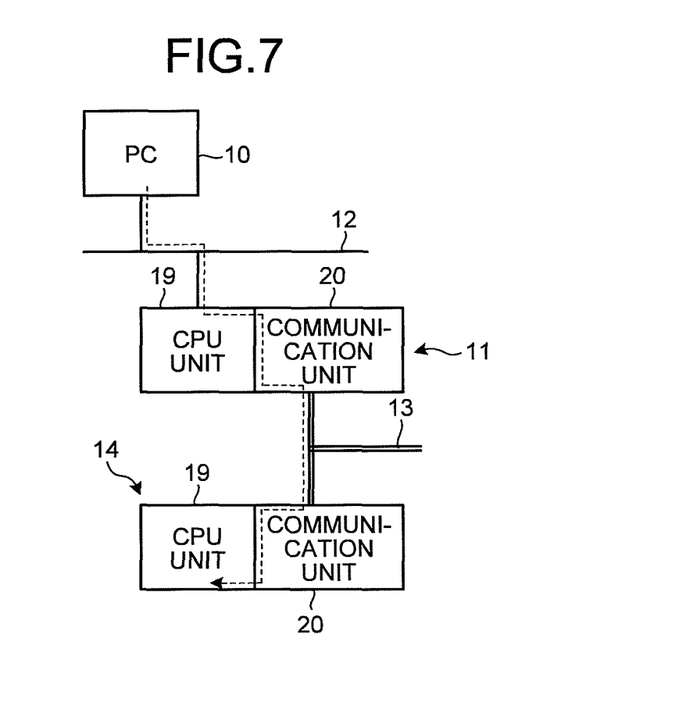
FIG. 7 is an explanatory diagram of another example of transmission and reception of data by the programmable logic controller connected via anther network in the network system shown in FIG. 1.

FIG. 7 is an explanatory diagram of another example of transmission and reception of data by a programmable logic controller connected via another network in the network system shown in FIG. 1. As shown in FIG. 7, when the PC 10 specifies data transmission to the CPU unit 19 of the programmable logic controller 14 connected through a different network, via the programmable logic controller 11, communication can be achieved only by setting an IP address of a communication target device (the programmable logic controller 14).

Figure 8:
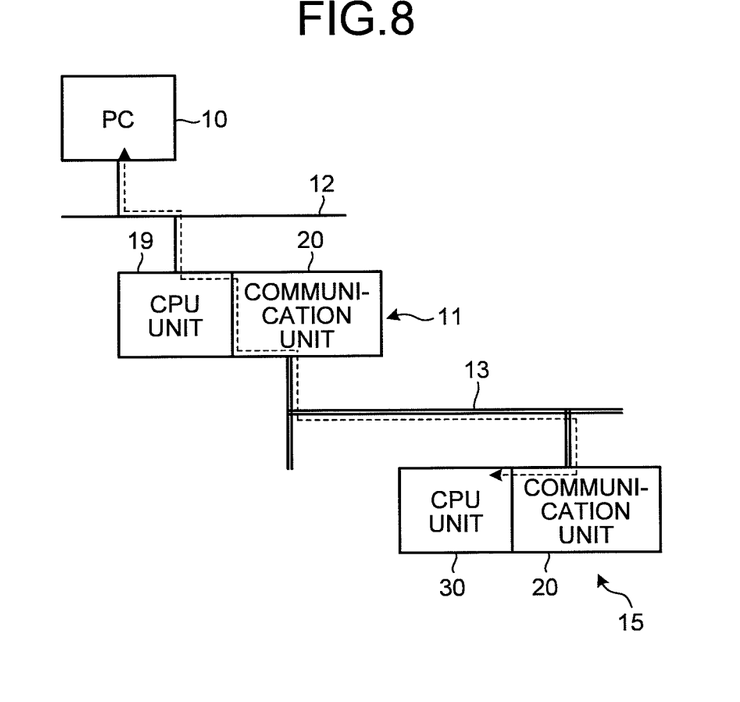
FIG. 8 is an explanatory diagram of still another example of transmission and reception of data by the programmable logic controller connected via another network in the network system shown in FIG. 1.

FIG. 8 is an explanatory diagram of still another example of transmission and reception of data by a programmable logic controller connected via another network in the network system shown in FIG. 1. As shown in FIG. 8, by providing the pseudo IP address, data communication using the Ethernet packet with the IP address can be achieved via a heterogeneous network also to the CPU unit 30 that does not have an Ethernet port incorporated therein.

According to the programmable logic controller of the first embodiment of the present invention, for the programmable logic controller and a communication device connected to different types of networks, communication can be performed by using the Ethernet packet, without providing a heterogeneous network gateway system.

Industrial Applicability

As described above, the programmable logic controller according to the present invention is useful for a network system in which the programmable logic controller is connected via different types of networks, and the programmable logic controller is particularly suitable for a network system in which the programmable logic controller is connected via a network different from the Ethernet and via the Ethernet.

Reference Signs List 10, 16, 18 personal computer (PC)
11, 14, 15 programmable logic controller
12 first network
13 second network
17 third network
19 CPU unit
20 communication unit
21 LAN interface (LAN I/F) (first port)
22 LAN driver
23 Ethernet module
24 Ethernet driver
25 packet buffer
26 internal bus (second port)
27 bus driver
28 FTP server/client
29 file system
30 CPU unit

The invention claimed is:

1. A programmable logic controller comprising a CPU unit, wherein:
   the CPU unit has a real IP address and a pseudo IP address different from the real IP address, transmits and receives data to and from a communication device belonging to a first network in which communication is performed using a first communication protocol by using the real IP address, and transmits and receives data to and from a communication device belonging to a second network different from the first network in which communication is performed using a second communication protocol different from the first communication protocol by using the pseudo IP address,
   wherein the CPU unit selectively transfers received data to be stored in a file system of the CPU unit according to whether a destination of the received data corresponds to an IP address of the CPU unit.

2. The programmable logic controller according to claim 1, wherein:
   the CPU unit comprises:
   a first port for transmission and reception of data by using the real IP address, and
   a second port for transmission and reception of data by using the pseudo IP address, and
   the first communication protocol is the Ethernet, and the second communication protocol is a communication protocol other than the Ethernet.

3. The programmable logic controller according to claim 2, wherein when a network address of an IP address as a destination of transmission data to be transmitted from the CPU unit is of the pseudo IP address, the CPU unit encapsulates the transmission data and transmits the transmission data from the second port.

4. The programmable logic controller according to claim 2, wherein:
   when a destination of received data received from the first port is an IP address of the CPU unit, the CPU unit transfers the received data to the file system, and
   when the destination of received data received from the first port is an IP address other than that of the CPU unit, the CPU unit transmits the received data from the second port.

5. The programmable logic controller according to claim 2, wherein:
   when a destination of received data received from the second port is an IP address of the CPU unit, the CPU unit transfers the received data to the file system, and
   when the destination of received data received from the second port is an IP address other than that of the CPU unit, the CPU unit transmits the received data from the first port.

* * * * *